US007619521B2

(12) United States Patent
Williams et al.

(10) Patent No.: US 7,619,521 B2
(45) Date of Patent: Nov. 17, 2009

(54) RFID NETWORK CONFIGURATION PROGRAM

(75) Inventors: Charles B. Williams, South Riding, VA (US); Kevin J. Kail, Great Falls, VA (US)

(73) Assignee: epcSolutions, Inc., Great Falls, VA (US)

( * ) Notice: Subject to any disclaimer, the term of this patent is extended or adjusted under 35 U.S.C. 154(b) by 230 days.

(21) Appl. No.: 11/235,098

(22) Filed: Sep. 27, 2005

(65) Prior Publication Data

US 2006/0080074 A1  Apr. 13, 2006

Related U.S. Application Data

(60) Provisional application No. 60/613,216, filed on Sep. 28, 2004.

(51) Int. Cl.
*G08B 13/14* (2006.01)

(52) U.S. Cl. ............. 340/572.1; 340/572.4; 340/572.7; 340/572.8; 345/156; 345/676; 716/2; 716/3; 716/11; 709/238

(58) Field of Classification Search ............. 340/572.1, 340/572.4, 572.7, 572.8; 345/810, 835, 734, 345/735, 771, 156, 676; 703/13, 21; 716/2, 716/3, 5, 11; 709/238
See application file for complete search history.

(56) References Cited

U.S. PATENT DOCUMENTS

| 5,867,163 A * | 2/1999 | Kurtenbach ................. 715/840 |
| 2002/0163498 A1* | 11/2002 | Chang et al. ................. 345/156 |
| 2003/0184596 A1* | 10/2003 | Kodosky et al. ............. 345/810 |

* cited by examiner

*Primary Examiner*—Tai T Nguyen
(74) *Attorney, Agent, or Firm*—John S. Hale; Gipple & Hale

(57) ABSTRACT

An RFID network design system comprising a website hosted on a host computer which generates and displays icons specifically directed to various RFID components of a RFID network on a computer screen display. The icons are able to be picked and dropped on a drawing screen by a remote user on a remote computer operated by the user and connected to the host computer website. The host computer is provided with software which only allows selected RFID components to be connected together to form a RFID network when the RFID components are compatible with each other with the connected components forming a workable RFID network displayed on a display screen.

15 Claims, 3 Drawing Sheets

_US 7,619,521 B2_

RFID NETWORK CONFIGURATION PROGRAM

RELATED APPLICATIONS

This application claims the benefit of Provisional Application No. 60/613,216 filed Sep. 28, 2004.

FIELD OF THE INVENTION

The present invention generally relates to an individual being able to design an RFID network for a facility by configuring the layout of an EPC-compliant network using a remote computer.

BACKGROUND OF THE INVENTION

Radio frequency identification (RFID) is becoming an important identification technology in numerous applications such as inventory management, security access, personnel identification, factory automation, and files and document identification. RFID systems utilize an RFID transmitter-receiver unit (usually referred to as a base station or interrogator) to query an RFID transponder or tag which may be located at a distance from the transmitter-receiver unit. The RFID tag which incorporates a chip detects the base station signal and transmits a response signal via an antenna incorporated in the tag containing encoded data back to the base station.

RFID systems provide identification functions not found in other identification technologies such as optical indicia (e.g., bar code) recognition systems. For example, RFID systems may employ RFID tags containing read/write memory of several kilobytes or more. The RFID tags may be readable at a distance and do not require direct line-of-sight view by the base station. Further, multiple RFID tags may be read by the RFID system at one time and specific item identification down to the individual unit can be undertaken using RFID tags. RFID tag reader equipment and associated equipment are commercially available and manufactured by a number of companies.

The breakthrough in RFID technology that allows the creation of electronic product code (EPC) is the conversion of the RFID tag from a database holding the information about the tagged item, to a URL that points to a database. That, together with the Internet, allows the creation and proper function of the EPC.

RFID systems, including tags, readers and middleware for same, are currently designed by specialists and the end user is often not given a choice of equipment, middleware with the resultant cost being quite expensive. One problem that exists is that some hardware is incompatible with other hardware and with various middleware and therefore compatible components must be selected. Thus, there exists a need to allow an end user to design a RFID network system according to the user own needs and without the present requirement of having consultants design same.

SUMMARY OF THE INVENTION

The present invention employs a graphic user interface to depict the components required for building and running a RFID network. Various RFID hardware and software components are displayed as icons on a web page which can be lifted and placed by a remote user on a drawing canvas. The icons are then connected to form the RFID network. The software of the invention includes a set of rules which ensures the RFID network components are properly connected. For example, only antennae that are known to work with a specific RFID reader are allowed to be connected to that reader. Equipment and middleware that do not work together are so indicated on the display screen. Furthermore, a reader may not be connected to another reader, only to a RFID Middleware Server.

It is an object of the invention to allow an end user to configure a working RFID network using the end user's choice of components and middleware.

It is yet another object of the invention to allow a user to order the RFID network components.

It is still another object of the invention to create a bill of materials which can be uploaded to a purchasing website.

It is another object of the invention to provide an end user with a schematic drawing of a working RFID network for the user's own businesses.

It is yet another object of the invention to allow an end user to upload a bill of material to a purchasing website which will automatically place the necessary order with the required vendors for the RFID components.

The invention can be implemented as a fully deployed system running entirely within a user's computer networking infrastructure or as a hosted service where key components are run on a provider's computer networking infrastructure and only those components readers and the software connected to the readers needed at customer facilities are deployed at the customer's facility.

These and other objects, advantages, and novel features of the present invention will become apparent when considered with the teachings contained in the detailed disclosure, which along with the accompanying drawings, constitute a part of this specification and illustrate embodiments of the invention which together with the description serve to explain the principles of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
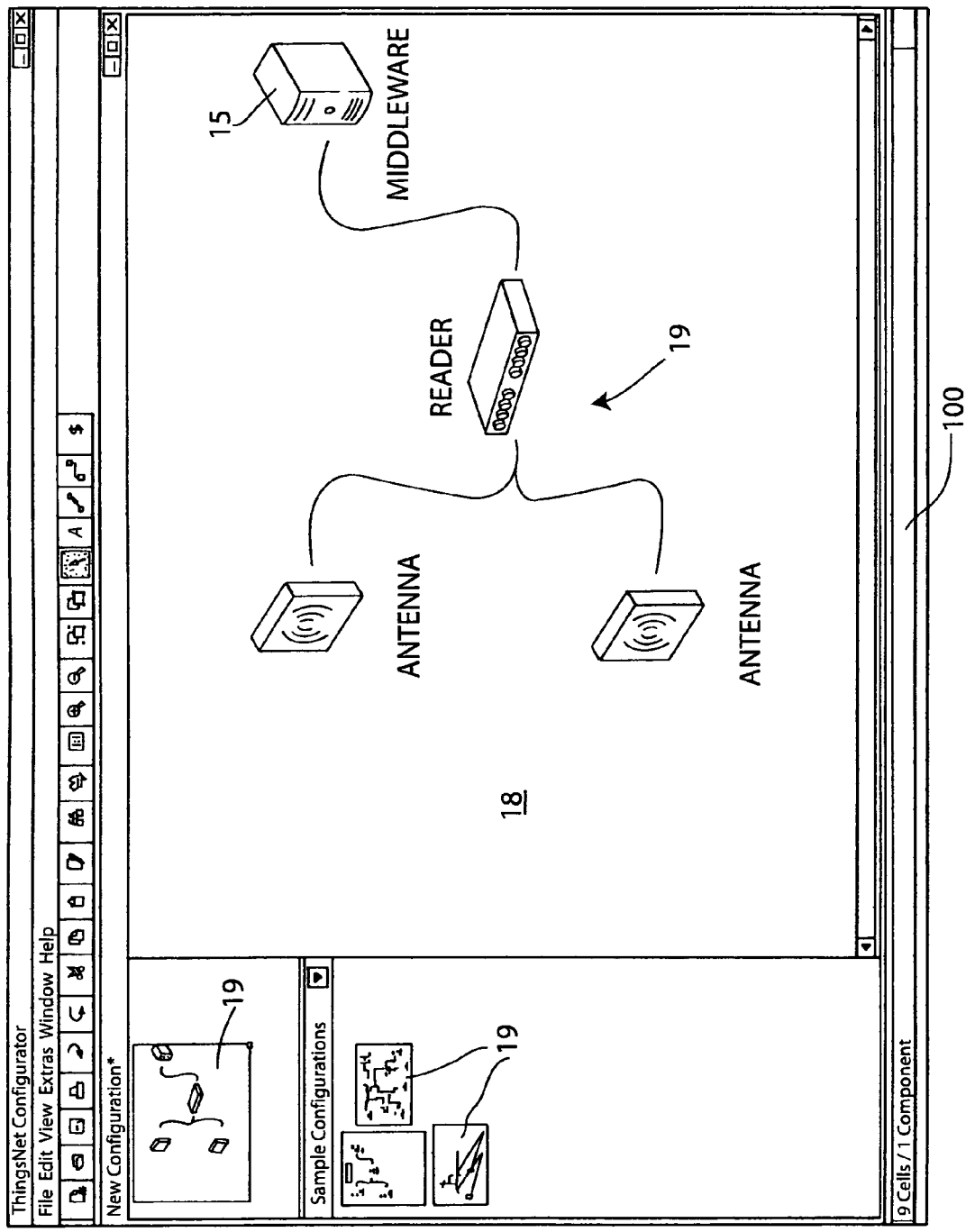
FIG. 1 is a diagram of an RFID Network drawing created on a computer screen with the invention.
Figure 2:
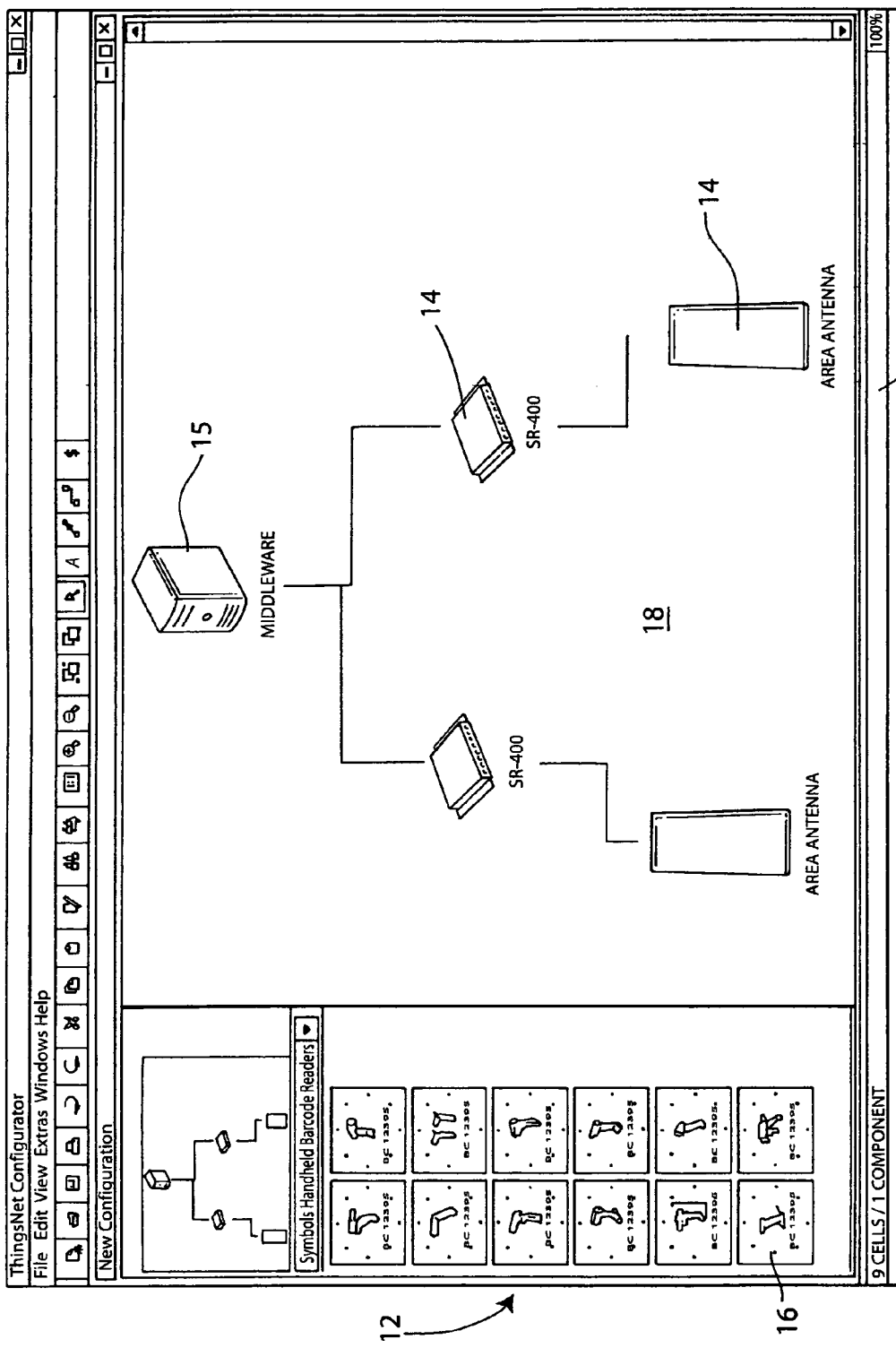
FIG. 2 is a diagram of the web page shown an icon pallet showing a series of hand held barcode and/or RFID readers manufactured by a specific company.
Figure 3:
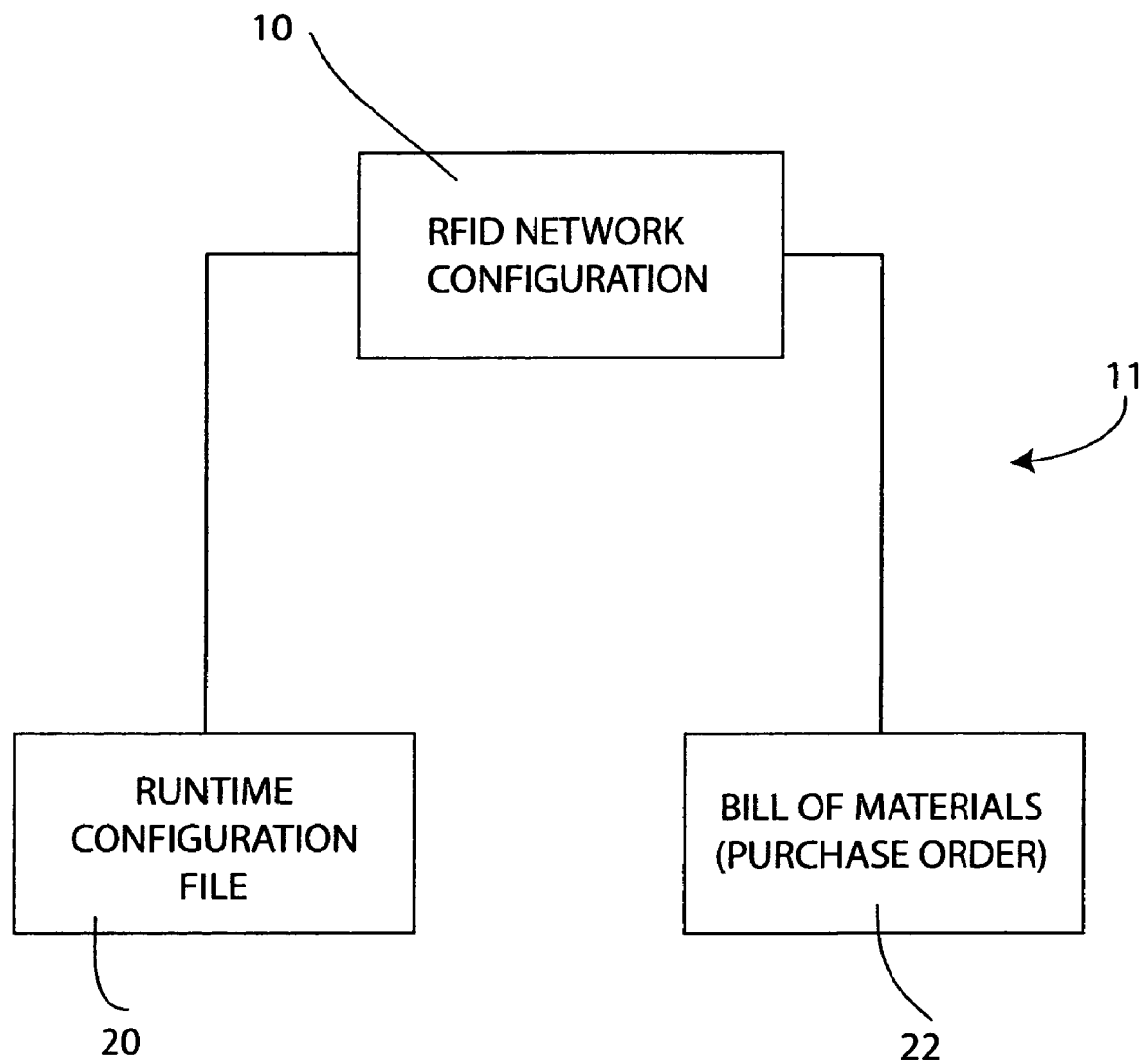
FIG. 3 is schematic of the invention shown interconnected software components of the invention.

The preferred embodiment and best mode of the invention is shown in FIGS. 1 through 3 and while the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

The RFID network configurator 10 is used to graphically design an RFID/Sensor network 11 on a computer screen display 100. The configurator 10 contains a user-selectable set of pallets 12. Each pallet contains a family of related RFID/Sensor components 14 and middleware 15 which may take the form of RFID antenna models by manufacturer, readers by manufacturer and middleware by manufacturer along with RFID certification companies. The components 14 and middleware 15 in each pallet 12 are grouped by manufacturer. After the user selects a pallet, icons 16 representing the components on that pallet are displayed. The icons 16 are dragged onto the drawing area 18. Icons from multiple pallets can be used in a single network configuration 19. Once the set of desired components is in the drawing area, the icons may be connected or linked together to form a network drawing. A software rules engine within the configurator 10 enforces connections between the components. Components 14 that are known to not work together are not allowed to be connected to each other and therefore cannot be connected to each other on the network drawing. Once the network drawing is complete, it is saved to a file so it can be reloaded in the configurator. The configurator 10 also saves the contents of the network to a file that is used to configure the RFID network at runtime. Upon finalization of the RFID network, the configurator also generates a purchase order for the component equipment or middleware shown on the network drawing.

FIG. 2 shows a collection of RFID network components, including both hardware and software components that are required for the creation and execution of an RFID network. The invention embodies a set of well-defined rules for how the various components are interconnected. The invention properly enforces these rules to ensure the correct creation and execution of the RFID network. For example, specific antennae can only be connected to specific RFID readers and RFID readers may only be connected to RFID Middleware Servers.

FIG. 3 shows the configuration file 20 that the invention generates. This configuration file is used as a middleware platform to properly configure the platform to connect to and to manage the various RFID hardware and software components.

The invention stores drawing information in files which can be reloaded into the application.

The invention uses the network drawing of the RFID network to create a bill of materials 22 that are required to implement the network as it is drawn. This bill of materials 22 is then used to place orders directly with the vendors of the specified RFID components via a website.

The invention also uses the drawing of the RFID network to create the configuration information required for network middleware platform to run the RFID network components. The invention stores various runtime parameters required for the RFID network to operate properly. These parameters are then written to a configuration file 20 which is used at system initialization time by the network middleware platform.

As previously noted, a bill of materials 22 is also generated by the invention. This bill of materials can be used by purchasing departments for buying the required RFID components needed to implement the network as it is drawn. This bill of materials can also be uploaded to a purchasing website which will automatically place the required orders with the required vendors for the RFID components.

A sample configuration program for Matrics RFID readers and antennas used in the invention is attached hereto.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What we claim is:

1. An RFID network design system comprising a website hosted on a host computer which generates and displays icons specifically directed to various RFID components of a RFID network on a remote user computer screen display, said icons being able to be picked and dropped on a drawing screen by a remote user on a remote computer operated by the user and connected to said host computer website, said host computer including software which only allows selected RFID components to be connected together to form RFID network when the RFID components are operable with each other, said connected components forming a workable RFID network displayed on said computer screen display; and a bill of materials is generated for the user after the RFID network has been constructed, wherein components of the RFID network as listed in the bill of materials are automatically ordered from vendors of the components upon the uploading of the bill of materials to a purchasing website.

2. The RFID network design system of claim 1 wherein said RFID components include hardware and software components that are required for the creation and execution of an RFID network.

3. The RFID network design system of claim 2 wherein said hardware components comprise RFID antenna models and RFID readers.

4. The RFID network design system of claim 3 where said hardware components are grouped by manufacturer.

5. The RFID network design system of claim 2 wherein said software components comprise RFID middleware.

6. The RFID network design system of claim 5 where said software components are grouped by manufacturer.

7. The RFID network design system of claim 1 wherein said host computer contains a user selectable set of pallets, each pallet containing a family of related RFID sensor components and middleware.

8. The RFID network design system of claim 1 wherein said software comprises a software rules engine which enforces connection between the RFID components so that RFID components that are known to work together are allowed to be connected to each other and components that are known not to work together are not allowed to be connected to each other.

9. The RFID network design system of claim 1 wherein each component of a RFID network has a plurality of icons representing components from different manufacturers.

10. The RFID network design system of claim 1 wherein said website includes software which determines if the selected RFID components as identified by said specific icons are compatible and will work together before allowing the same to be connected together.

11. An RFID design system comprising a host computer which has a display of pallets of icons, each pallet displaying icons directed to specific hardware and software components required for a RFID network produced by different manufacturers, said icons being able to be picked and dropped on a drawing screen connected to a remote user on a remote computer operated by the user, software contained in said host computer which compares the operability compatibility of connected icons allowing said icons to be connected together when said software recognizes that the components represented by the icons are compatible and work together but refuses to allow incompatible icons to be connected together, said connected components forming a workable RFID network which can be downloaded by a user; and a bill of materials is generated for the user after the a compatible RFID network has been constructed, wherein components of the RFID network are listed in a bill of materials with are automatically ordered from vendors of the components upon the uploading of the bill of materials to a purchasing website.

12. The RFID network design system of claim 11 wherein said components comprise RFID antenna models, RFID readers, and RFID middleware.

13. The RFID network design system of claim 11 wherein said software in said host computer is a software rules engine which enforces connection between the components so that components that are known to work together are not allowed to be connected to each other and components that are known to work together are allowed to be connected to each other.

14. The RFID network design system of claim 11 wherein each pallet has a plurality of icons representing components from different manufacturers.

15. An RFID design system comprising a host computer which has a display of pallets of icons, each pallet displaying icons directed to specific components for a RFID network available from different manufacturers, said icons being able to be picked and dropped on a drawing screen connected to a remote user on a remote computer operated by the user, software contained in said host computer comprising a software rules engine which enforces connection between the components so that components that are known to work together are not allowed to be connected to each other and components that are known to work together are allowed to be connected to each other, said connected components forming a workable RFID network drawing which can be downloaded by a user, said RFID network drawing being saved to a file that is used to configure the RFID network at runtime; and a bill of materials is generated for the user after the a compatible RFID network has been constructed, wherein components of the RFID network are listed in a bill of materials with are automatically ordered from vendors of the components upon the uploading of the bill of materials to a purchasing website.

* * * * *